April 5, 1955 J. P. LEKAS 2,705,639

MAGNETIC TYPE RECORDER AND PLAY BACK UNIT

Filed Dec. 16, 1949 6 Sheets-Sheet 1

INVENTOR.
JOHN P. LEKAS

BY E. J. Balluff
ATTORNEY

INVENTOR.
JOHN P. LEKAS
BY E. J. Balluff
ATTORNEY

April 5, 1955 J. P. LEKAS 2,705,639

MAGNETIC TYPE RECORDER AND PLAY BACK UNIT

Filed Dec. 16, 1949 6 Sheets-Sheet 3

INVENTOR.
JOHN P. LEKAS
BY E. J. Balluff
ATTORNEY

April 5, 1955 J. P. LEKAS 2,705,639

MAGNETIC TYPE RECORDER AND PLAY BACK UNIT

Filed Dec. 16, 1949 6 Sheets-Sheet 4

INVENTOR.
JOHN P. LEKAS
BY
E. J. Balluff
ATTORNEY

April 5, 1955 J. P. LEKAS 2,705,639

MAGNETIC TYPE RECORDER AND PLAY BACK UNIT

Filed Dec. 16, 1949 6 Sheets-Sheet 5

INVENTOR.
JOHN P. LEKAS
BY E. J. Balluff
ATTORNEY

April 5, 1955 J. P. LEKAS 2,705,639

MAGNETIC TYPE RECORDER AND PLAY BACK UNIT

Filed Dec. 16, 1949 6 Sheets-Sheet 6

INVENTOR.
JOHN P. LEKAS

BY E. J. Balluff

ATTORNEY

United States Patent Office 2,705,639
Patented Apr. 5, 1955

2,705,639

MAGNETIC TYPE RECORDER AND PLAY BACK UNIT

John P. Lekas, Ann Arbor, Mich., assignor to James A. Kennedy, Ann Arbor, Mich.

Application December 16, 1949, Serial No. 133,313

15 Claims. (Cl. 274—4)

This invention relates to recording and reproducing devices of the type employing an elongated magnetic record medium. More particularly, the invention has reference to a recorder and play back unit incorporating improvements in the mechanism for driving the medium; improvements in the mechanism for reversing the drive of the medium; an improved arrangement for holding the medium in operative relation with the recording and reproducing head; a high speed shuttle arrangement for rewinding a reel; a novel multiple unit head construction; and novel and improved controls which greatly increase the utility of devices of this kind and which make the same very flexible in their mode of operation.

While there has been and now is considerable interest and activity in recording and reproducing devices of this kind, so far as I am aware, the devices which have been available commercially are not entirely satisfactory and have a limited utility.

Principal objects of the invention, therefore, are to provide:

A new, improved, and simplified recorder and play back unit;

A new and improved arrangement for holding an elongated magnetic record medium in operative relation with the magnetic recording and/or reproducing head;

A new and improved reverising mechanism for automatically reversing the direction of drive of the record medium at each end thereof so that the unit will continue to play indefinitely;

A high speed shuttle arrangement which makes it possible quickly to rewind a reel;

A novel multiple unit head construction; and

A new and improved control arrangement for the unit which increases the utility and adaptability of the unit.

Other and further objects of the invention will be apparent from the following description and claims and may be understood by reference to the accompanying drawings, of which there are six sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

Figure 1:
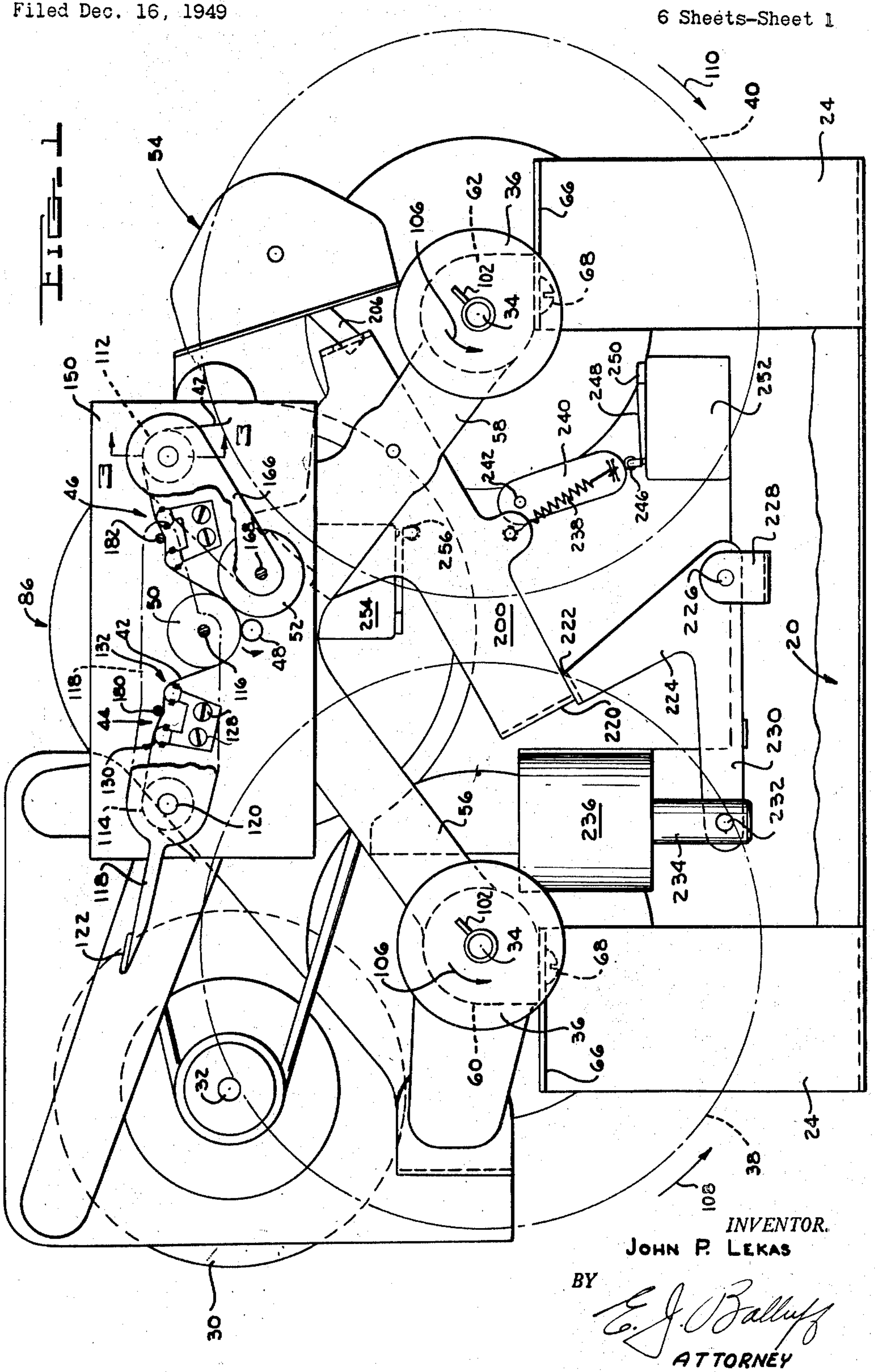
Fig. 1 is an elevational view of the front face of a unit embodying the invention.
Figures 2, 3, 4:
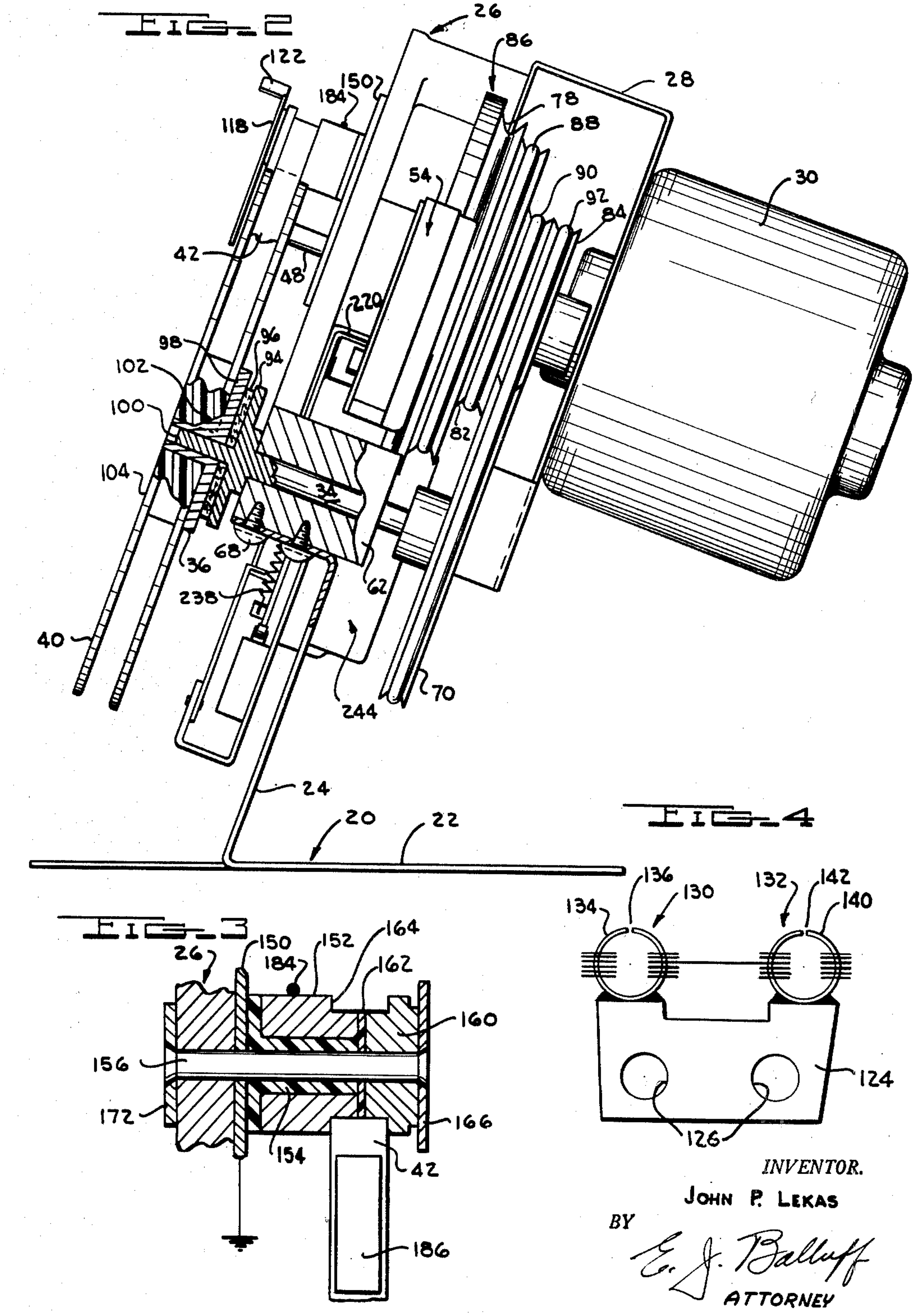
Fig. 2 is a side elevational view thereof with certain parts broken away.
Fig. 3 is an enlarged section taken along the line 3—3 of Fig. 1, looking in the direction of the arrows.
Fig. 4 is an enlarged elevational view of the magnetic recording, reproducing and erasing head.

As illustrated in Figs. 1, 2, 5 and 6, the unit comprises a frame indicated generally at 20 having a base 22 and upstanding inclined legs 24. A frame indicated generally at 26 is mounted upon the legs 24. A bracket 28 carried by the frame has an electric motor 30 mounted thereon, the motor including a drive shaft 32. A pair of reel driving shafts 34 is mounted on the frame 26 and each of said shafts has mounted thereon a clutch member or reel holding and driving member 36 (Fig. 2). A pair of reels 38 and 40 is mounted on the members 36. An elongated magnetic record medium in the form of a tape 42 is wound on the reel 38 and connected to the reel 40 so that such tape may be wound on the reel 40 as it is unwound from the reel 38, and vice versa.

The unit or device further includes a pair of magnetic head units or assemblies indicated generally at 44 and 46, a capstan or tape driving member 48, a pair of idlers or rollers 50 and 52, and a four pole, two-position lever actuated switch 54.

As shown in Fig. 1, the frame 26 includes a pair of arms 56 and 58 terminating in blocks 60 and 62. Each of the blocks 60 and 62 seats upon a laterally projecting flange 66 formed on the upper end of the legs 24 and is secured thereto by screws 68 which are threaded into tapped holes in the blocks 60 and 62, as shown in Fig. 2. The blocks 60 and 62 are each bored to form a bearing for one of the shafts 34 which is journalled therein. It will be observed that the legs 24 and the frame 26 are inclined, as a result of which the shafts 34 are inclined to the horizontal.

On the rear side or face of the unit each of the shafts has affixed thereto a drive pulley 70. The motor shaft 32 has affixed to its drive pulleys 72 and 74 of different diameter relative to each other. The capstan or tape driving member 48 comprises a shaft which is journalled in a bearing 76 provided on the frame, and the end of the shaft 48 on the rear face of the unit is provided with a series of pulleys 78, 80, 82 and 84 which form part of a flywheel indicated generally at 86. An endless belt 88 drivingly interconnects the pulleys 72 and 80. If it is desired to drive the unit at a lower speed, the belt 88 may be arranged in driving relation with the pulleys 74 and 78 instead of the pulleys 72 and 80.

The pulleys 78, 80, 82 and 84 are all connected together and to the shaft 48 so that the shaft 48 and the pulleys 82 and 84 will turn with the pulley 80. A belt 90 is arranged in driving relation with the pulley 82 and one of the pulleys 70 for driving one of the shafts 34, and a belt 92 is arranged in driving relation with the pulley 84 and the other pulley 70 for driving the other shaft 34.

With the belt and pulley driving arrangement as shown, the shaft 48 will turn at about twice the speed of the shafts 34, and the shaft 48 which drives the tape is adapted to drive the same at a speed of 3¾ inches per second. It will be observed that the shafts 34 and 48 all turn in the same direction and that the shafts 34 are driven at the same speed.

On their left-hand or upwardly projecting ends, as illustrated in Fig. 2, the shafts 34 are provided with a disc 94 which forms a part of a friction clutch or slipping drive between the shaft 34 and each reel. The reel holding and driving member 36 forms another part of said friction clutch or drive, and a disc 96 of felt or similar material is arranged between the disc 94 and the disc portion 98 of the member 36.

The member 36 is free to turn on the extension 100 of the shaft 34 and includes a rib 102 which is adapted to engage in a notch in the hub 104 of the reel 38 or 40 so as to provide a positive drive between the member 36 and the reel 38 or 40. The pressure with which the felt disc 96 is clamped between the discs 94 and 98 will determine the torque with which the reel 38 or 40 is driven from the shaft 34, and this is determined by the mass of the reel 38 or 40 and the mass of the tape 42 which is wound upon such reel. As the tape 42 unwinds from the reel 38 or 40, the mass of such reel and the tape wound thereon will decrease, and hence the pressure with which the disc 96 is clamped between the discs 94 and 98 will decrease, and hence the torque transmitted to the reel 38 or 40 from the shaft 34 tending to turn such reel will decrease.

The shafts 34 are driven in the direction of the arrows 106 (Fig. 1). However, as shown in Fig. 1, the driving mechanism for the tape 42 is driving the tape in a direction so as to unwind it from the reel 40 and to permit it to wind on the reel 38. It will be observed that the shaft 34 is tending to turn the reel 38 in a direction as to the wind the tape 42 thereon, the reel 38 turning in the direction indicated by the arrow 108. While the other shaft 34 is turning in the direction indicated by the arrow 106, the reel 40 is turning in the opposite direction indicated by the arrow 110 since the tape is being unwound from the reel 40. The friction or slipping driving arrangement provided between the shaft 34 and the clutch member 36 for the reel 40 will put sufficient drag on the clutch member 36 so as to keep the reel 40 from unwinding too freely.

The tape 42 in traveling between the reels 40 and 38 passes over the guide 112, thence across the head unit 46, thence between the rollers 50 and 52, thence over the other head unit 14, thence over a guide 114, and thence on to the reel 38. In traveling from the reel 40 to the reel 38, the tape 42 passes between the capstan 48 and the roller 50, the roller 50 being biased toward the capstan 48 so as to provide sufficient pressure on the tape 42 therebetween to drive the same without slipping. When the tape 42 is traveling from the reel 38 to the reel 40, the relative position of the rollers 50 and 52 has been changed so that the roller 52 is being driven by the capstan 48, and the roller 52 in turn drives the tape 42, since the tape 42 passes between the rollers 50 and 52 which are biased into engagement with each other, as will be explained more fully hereafter.

The roller 50 is carried on a shaft 116 which is carried by an arm 118 pivoted at 120, the arm having an extension 122 so that the arm 118 may be pivoted in a counterclockwise direction (Fig. 1) in order to swing the roller 50 out of engagement with the capstan 48 and the roller 52, thereby breaking or stopping the drive of the tape 42. The guides 112 and 114 are positioned at the same elevation and above the head units 44 and 46 so that when the arm 118 is raised as just described, the tape 42 will extend horizontally between the guides 112 and 114 and out of operative relation with the head units 44 and 46.

With the driving arrangement as illustrated between the shafts 34 and the reels 38 and 40 it is possible to effect a quick shuttle of the tape from one reel to the other, and this may be done by exerting pressure on the hub of the reel on which it is desired to wind the tape in a direction so as to exert considerable pressure on the felt disc 96 so that the shaft 34 for such reel will drive such reel at or approximating the speed of the shaft 34 which, as illustrated, may be of the order of 380 R. P. M. At the time that this high speed shuttling or rewinding operation is performed, it is, of course, advisable that the arm 118 and the roller 50 be shifted to their raised position so that the tape 42 may freely travel from one of the reels to the other.

A part of one of the head units is shown in Fig. 4 and comprises a brass block 124 provided with mounting holes 126 for the mounting screws 128. Each of the head units 44 and 46 as illustrated includes an erase head indicated generally at 130 and a play back and recording head indicated generally at 132, it being understood that the head 132 may be employed either for recording on the tape 42 or for reproducing the recording thereon.

The erase head comprises a sleeve or ring 134 of high permeability steel, such as Alleghany Ludlum MuMetal or 4750, and is provided with a gap 136 of the order of .005 in. and a winding comprising twenty turns of No. 32 heavy Formvar wire. The sleeve or ring 134 is soldered to the block 124. The play back and recording head 132 comprises a sleeve or ring 140 of the same material as the sleeve 134 and having a gap 142 of .0005 in. The play back and recording head 132 is provided with a winding of one hundred turns of No. 40 heavy Formvar wire and four turns of No. 32 heavy Formvar wire in series with the winding of the erase head. The sleeves 134 and 140 may be turned from rod stock and the gaps milled therein after they are assembled to the brass block 124.

Since the tape 42 is adapted to play in both directions of travel, it is provided with two sound tracks thereon. The active or operative parts of the head units 44 and 46 are only half as wide as the width of the tape 42 or as wide as the track on the tape with which they are adapted to cooperate.

Figures 5, 10, 11:
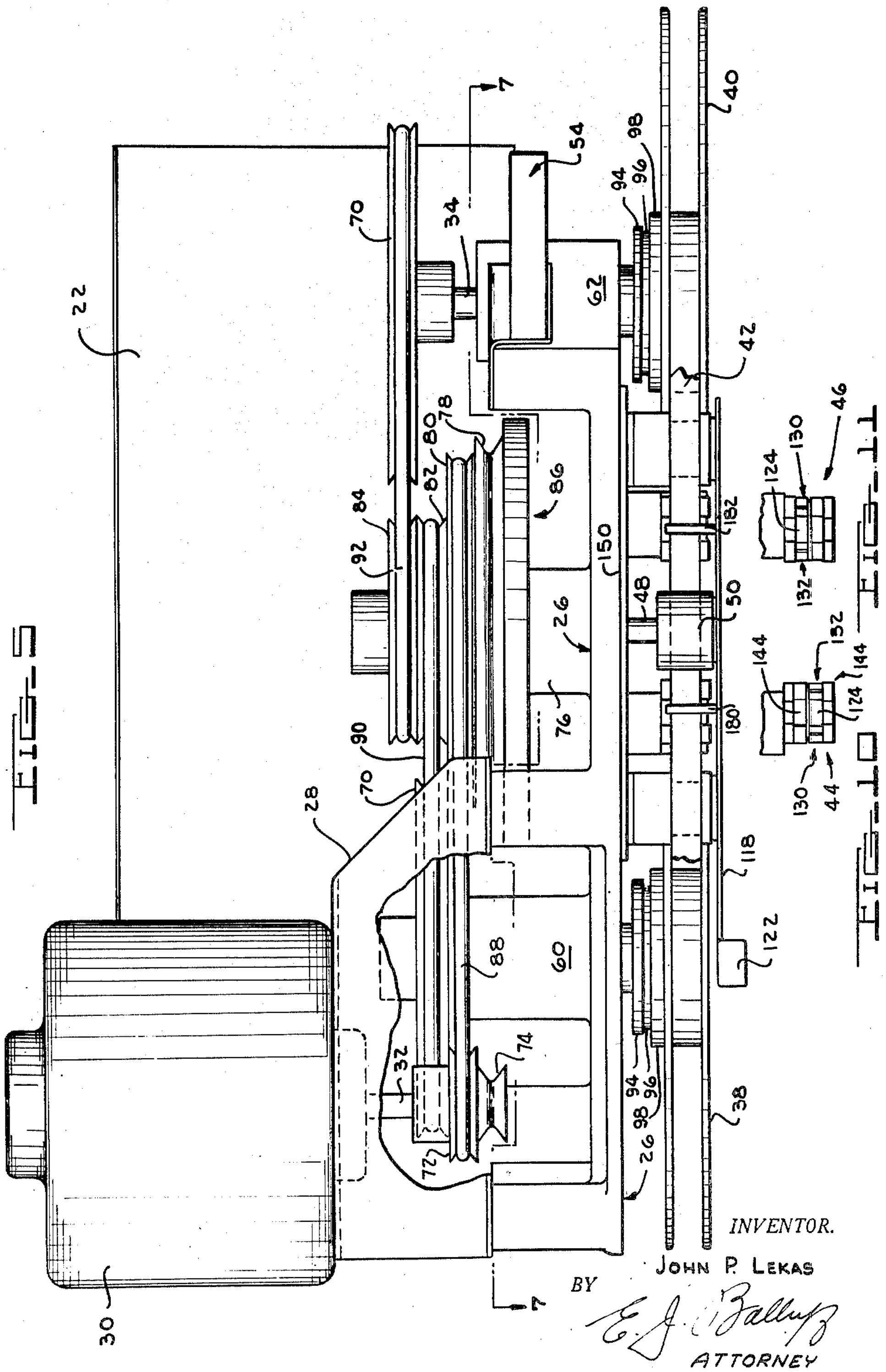
Fig. 5 is a top plan view of the apparatus as illustrated in Fig. 1, with certain parts broken away.
Figs. 10 and 11 are top plan views of the magnetic erasing, recording and reproducing heads.
Figure 6:
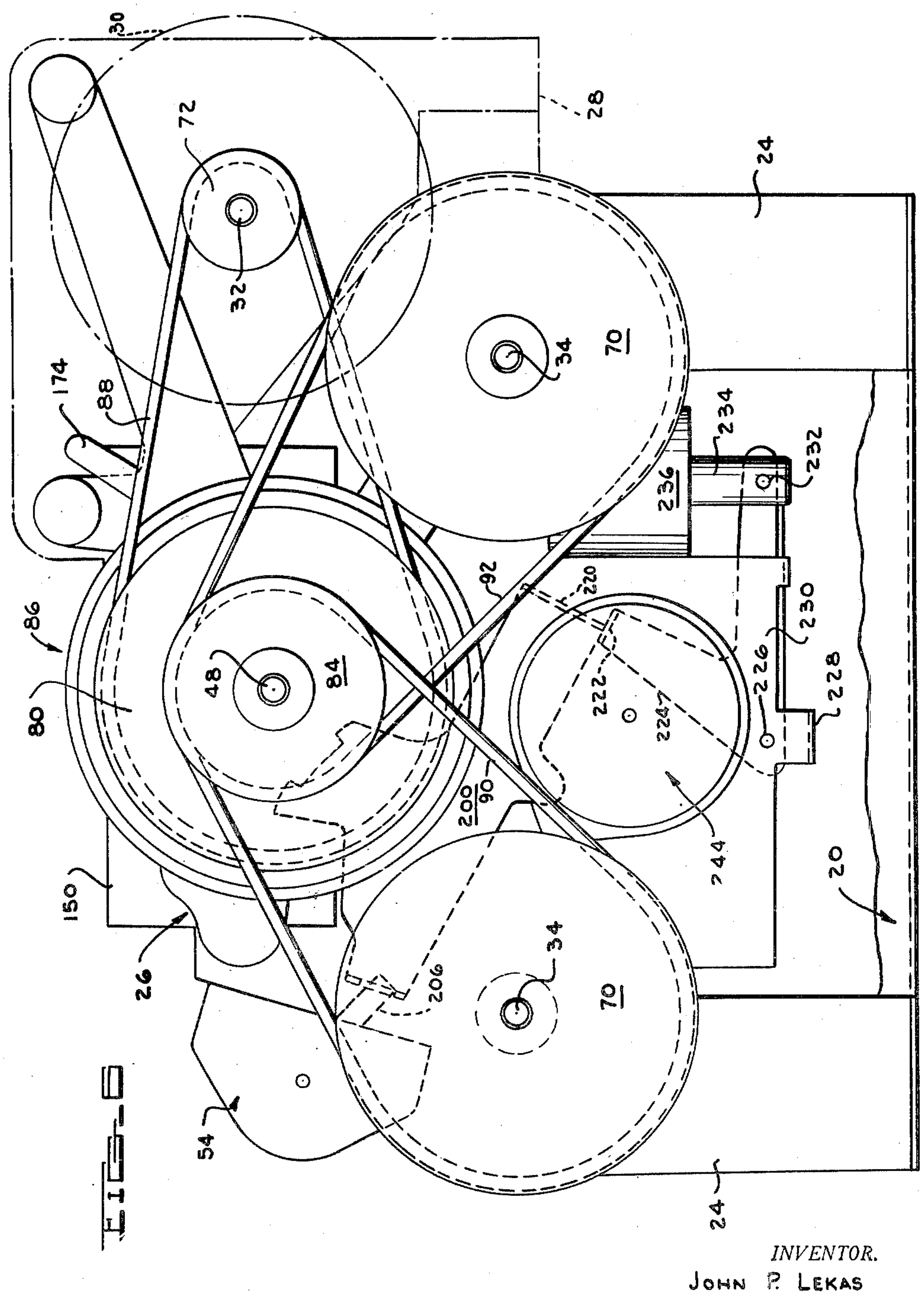
Fig. 6 is an elevational view of the rear of the unit.

The head unit 44 thus comprises a block 124 having the poles or heads 130 and 132 and a dummy block 144. The dummy block 144 has the same configuration as the block 124 shown in Fig. 4 except that the heads are not bored out and there are no windings, such dummy blocks 144 being designated as keepers. Additional dummy blocks or keepers 144 may be assembled as shown in Fig. 10 so as to provide a head unit which is wider than the tape 42 so that the tape 42 will not tend to slide off one side or the other of the head unit.

The construction of the head unit 46 is the same as that of the head unit 44 except that the block 124 having the erase head 130 and the play back and recording head 132 is arranged to cooperate with the track on the other side of the tape 42 so that in one direction of tape travel one of the head units 44 will be operatively positioned relative to one of the sound tracks on the tape, and in the other direction of tape travel the other of the head units will be operatively positioned with respect to the other of the sound tracks on the tape.

It should also be noted that the erase heads 130 are on the outside of the play back and recording heads 132 so that if the machine is being used for recording, the erase head 130 will clean the tape 42 just prior to the movement of the tape over the recording and play back head 132. This laminar construction for the head units 44 and 46 makes it possible to easily and conveniently add units to or subtract units from the head. For example, if it is desired to simultaneously record or reproduce two sound tracks on the tape, this could be done by building up a head consisting of an assembly like that shown in Fig. 4 with a dummy block and then another assembly like that shown in Fig. 4, and so on. The dummy blocks 144 furthermore serve to prevent interference between adjacent sound tracks passing over the head.

The head units 44 and 46 are mounted upon a panel 150 which is mounted upon the frame 26. A sectional view through the guides 112 and 114 is shown in Fig. 3. Such guides comprise a cylindrical block 152 mounted upon an insulating bushing 154 which in turn is mounted upon a pin or shaft 156, the pin extending through a hole in the frame 26 and through the panel 150 which is arranged between the bushing 154 and the frame 26. The bushing 154 insulates the block 152 from the pin 156, as well as from the panel 150 which is electrically grounded as shown.

A second cylindrical block 160 is also mounted upon the pin 156 and insulated from the block 152 by means of the insulating washer 162. Blocks 160 and 152 are grooved as shown to form a channel 164 which forms either the guide 114 or the guide 112. As shown in Fig. 3, an arm 166 is mounted on the pin 156 so as to turn with the pin 156, and this arm is provided with a pin or shaft 168 upon which the idler or roller 52 is journalled. A spring 170 (Fig. 7) biases the arm 166 in a clockwise direction. One end of the spring 170 is connected to an arm 172 affixed to the other end of the pin or shaft 156 and tends to turn such shaft in a counterclockwise direction (Fig. 7), that is, in a direction tending to move the roller 52 toward the roller 50 (Fig. 1).

The guides 112 and 114 formed by the channels 164 are aligned with the head units 44 and 46 so that the tape 42 in passing over the guides 112 and 114 will be in proper alignment with the head units 44 and 46.

Figure 7:
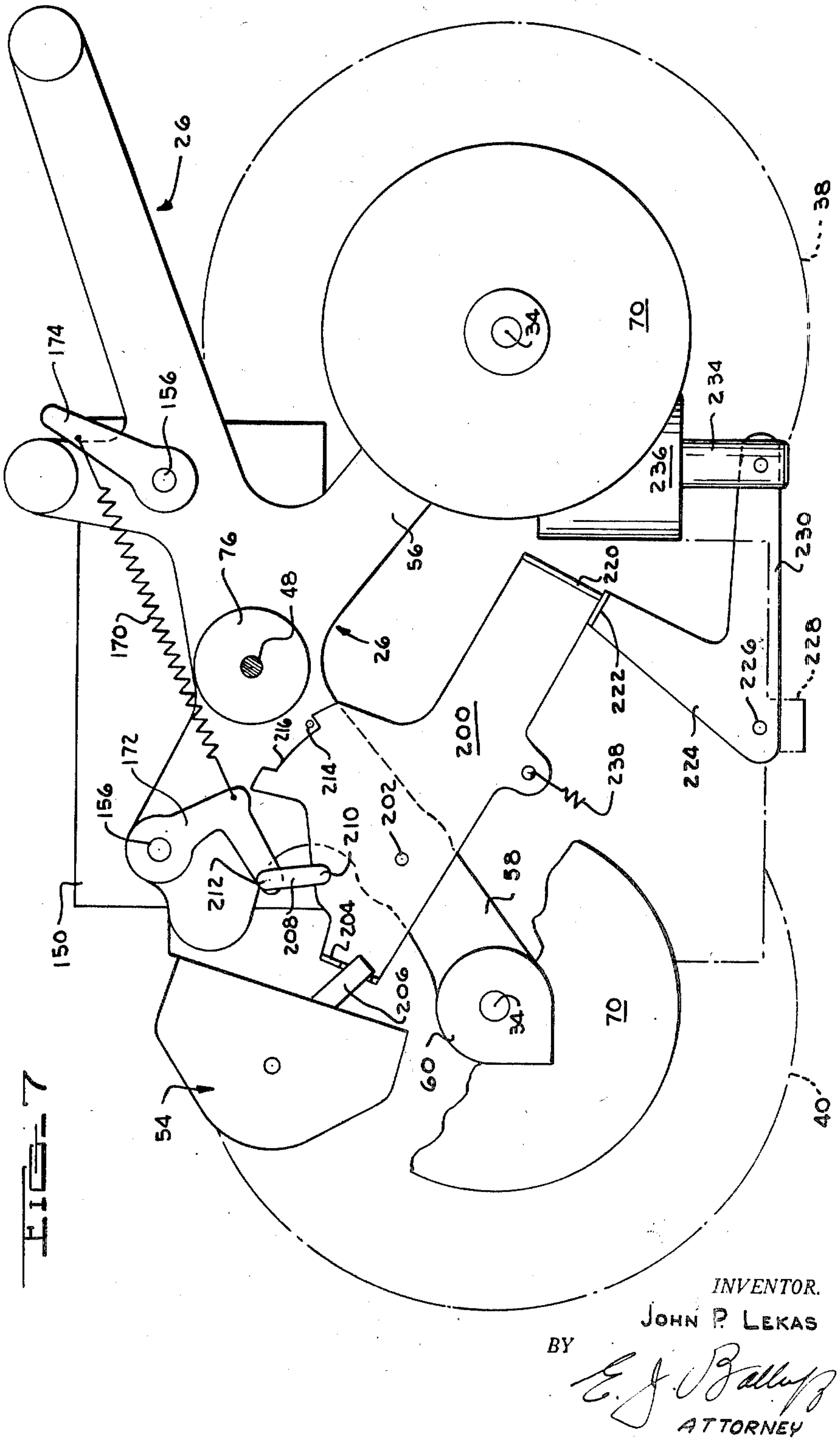
Fig. 7 is a sectional view taken along the staggered line 7—7 of Fig. 5.

While Fig. 3 is a section taken along the line 3—3 of Fig. 1, it also accurately reflects a similar section taken through the guide 114, the only difference being that in place of the arm 166, the arm 118 is secured to the pin 156, and in place of the arm 172, the arm 174 is secured to the shaft 156. The other end of the spring 170 is connected to the arm 174 as shown in Fig. 7, which tends to turn the shaft 156 of the guide 114 in a direction which urges the idler or roller 50 toward the capstan 48. It will be remembered that the idler 50 is journalled on shaft 116 which is carried by lever 118 pivoted at 120, the reference character 120 indicating also the shaft corresponding with the shaft 156 for the guide 114.

The lever 118 is provided with a pair of laterally extending pins 180 and 182. When the arm 118 is down, as shown in Fig. 1, the pin 180 will lie between the two heads of the head unit 44, the pin 180 being disposed at an elevation slightly below a straight line which would interconnect the tops of the heads 130 and 132. The pin 182 is similarly disposed with respect to the heads of the head unit 46.

It will be observed that the tape 42 in passing over the guide 112, the heads of the head unit 46, the pin 182 which forms a guide, between the rollers 50 and 52, over the heads of the head unit 44, and over the guides 180 and 114, follows a devious path which has the effect of holding the tape 42 on the heads with the proper pressure in order to obtain the most efficient operation of the unit.

The cylindrical blocks 152 of each of the guides 112 and 114 are electrically interconnected by a conductor 184, and the blocks 160 are each grounded through the shaft 156. Each end of the tape 42 is provided with a current conducting portion 186 just a short ways ahead of the end of the tape 42, such portion 186 as it passes over the portions of the blocks 152 and 160 being adapted to provide a current conducting path between the blocks 152 and 160, thereby closing the solenoid circuit hereinafter described which initiates the operation of the reversing mechanism.

The reversing mechanism includes a rocker arm 200 pivoted to the frame at 202. A laterally turned flange 204 on the rocker arm 200 has the actuating lever 206 of the switch 54 extending into a slot in such flange 204 so that as the lever shifts from the position in which it is shown in a clockwise direction to its other position, and vice versa, the switch actuating lever 206 will be shifted so as to operate the switches which are associated with the reversing mechanism, as will hereinafter be described.

A link 208 pivoted at 210 to the rocker arm 200 and at 212 to the end of the arm 172 transmits motion to the arm 172 so as to move the same in a counterclockwise direction about the axis of the shaft 156 to which it is affixed. This will cause the arm 166 to swing in a clockwise direction (Fig. 1) until the roller 52 engages the shaft 48, and at the same time the roller 50 will be shifted out of driving relation with the shaft 48 but will, of course, still be urged against the roller 52.

A pin 214 carried by the frame 26 projects into a slot 216 in the rocker arm 200 and limits the extent of movement thereof, and in addition cooperates with the shoulders at the end of the slot to define the two positions of the rocker arm. The other end of the rocker arm is provided with a laterally turned flange or end 220 which is engaged by the laterally turned end 222 of a trip lever 224, such trip lever when arranged as shown in Figs. 1 and 7 holding the rocker arm 200 in its position as illustrated. The trip lever is pivoted at 226 to a bracket 228 and the other arm 230 of the bell crank or trip lever 224 is pivoted at 232 to the core 234 of a solenoid 236 shown in its de-energized position. Upon energization of the solenoid, the core 234 raises and pulls the end 222 of the trip lever out from beneath the end 220 of the rocker arm 200.

A spring 238 connected at one end to the rocker arm 200 biases the same when in the position as illustrated in Fig. 7 in a clockwise direction for shifting the rocker arm 200 to its other position, that is, until the other end of the slot 216 abuts the pin 214. Thus, energization of the solenoid 236 trips the rocker arm 200, whereupon the rocker arm will throw the lever 206 of the switch 54 to its other position and transmit motion to the arm 172 so as to shift the rollers 50 and 52 into their other position relative to the shaft 48.

Since the shaft 48 always rotates in the same direction during operation of the motor 30, it will be evident that when the roller 52 is shifted into driven relation with the shaft 48 and the roller 50 shifted out of driven relation with such shaft, the roller 52 will drive the tape 42 in a direction opposite to that in which it is driven when the rollers 50 and 52 are arranged as illustrated in Fig. 1.

The roller 50 is free to move upwardly since upward motion of the arm 118 is restrained by the spring 170 which is connected to the lever 174. The arm 118 may, as previously pointed out, be raised by depressing the lever 122 so as to shift the roller 50 out of contact with the roller 52, which will permit the tape 42 to move out of driving relation with the shaft 48 and the roller 52, and also out of operative relation with respect to the head assemblies 44 and 46.

When the solenoid trips the rocker arm 200, the spring 238 will, as previously indicated, cause the rocker arm 200 to rotate in a clockwise direction (Fig. 7). As the solenoid circuit is only energized momentarily, the core 234 will drop under the influence of gravity upon de-energization of the solenoid and shift the bell crank 224 so as to lock the end 220 of the rocker arm 200 below the laterally extending flange 222 of the bell crank.

The other end of the spring 238 is, as shown in Fig. 1, connected to a cam 240 which is secured to a shaft 242 to rotate therewith. The shaft 242 is the drive shaft of a motor drive unit indicated generally at 244. Such motor drive unit may comprise a motor and speed reducing unit of the type commonly employed in connection with clock timers. The electric motor of the motor drive unit 244 is energized during the reversing operation so as to turn the cam 240 one hundred eighty degrees to its other position. In the position as shown in Fig. 1, the cam is engaged with a roller 246 which is mounted on the free end of a spring arm 248 mounted upon a block 250, which in turn is mounted upon the case of a microswitch 252. As shown in Fig. 1, the member 246 when engaged by the cam 240 is adapted to hold the switch contacts of the microswitch in a position other than the normal position thereof.

A second microswitch 254 has its actuating member 256 arranged to be engaged by the end of the cam 240 when the cam is shifted 180° from the position illustrated in Fig. 1, the microswitch 254 being identical with the microswitch 252 and the came 240 being adapted to hold the switch contacts of the microswitch 254 in a position other than the normal position thereof.

Figure 9:
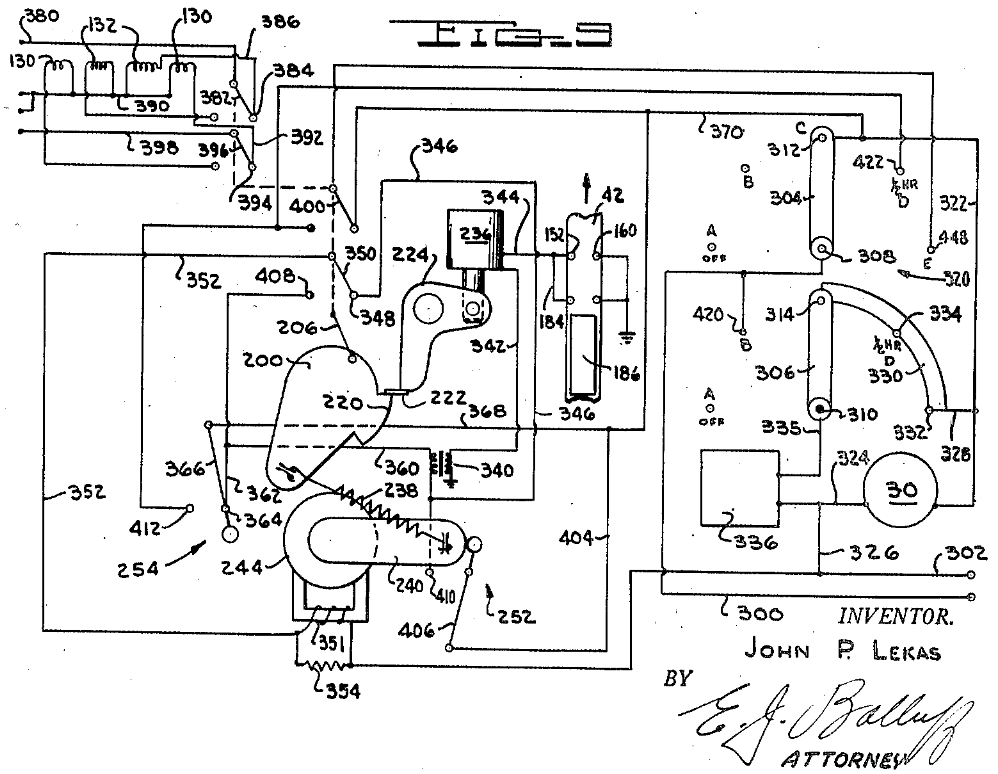
Fig. 9 is a diagrammatic view similar to Fig. 8, but illustrating the arrangement of the parts when the unit is operating and the record medium is running from right to left.

Fig. 9 is a diagrammatic illustration of the control circuits and of certain of the mechanical parts of the unit which control and effect the opening and closing of the various switches in the several circuits which form the control for the unit, and Fig. 9 shows such control arranged with the unit running and the tape traveling from right to left, that is, from the reel 40 to the reel 38.

Conductors 300 and 302 are adapted to be connected to a source of electric current, such for example as 110 volt A. C. Switch arms 304 and 306 pivoted at 308 and 310 respectively form the movable contacts of a 5-pole, two-position rotary switch which may be set to control the mode of operation of the unit, such switch being hereinafter designated as switch 320. It is to be understood that the arms 304 and 306 are mechanically interconnected but electrically insulated from each other so that they will both move about their pivots at the same time and to the same extent.

The arms of the switch 320 are shown in the position marked C which provides for continuous, automatic play of the unit. The conductor 300 is connected to the switch arm 304 at the pivot point 308 thereof, and the switch arm 304 is engaged with the stationary contact 312 of the switch 320. Conductor 322 connected to contact 312 leads to one side of the windings of the motor 30, and the other side of the windings of the motor 30 is connected by conductors 324 and 326 to the other side 302 of the current supply line. Conductor 322 is also connected by conductor 328 and bar 330 to stationary contacts 332, 334 and 314 of the switch 320, and as shown in Fig. 9, the movable contact arm 306 is engaged with stationary contact 314.

Conductor 335 connects contact arm 306 with one side of the amplifier 336, the other side of the amplifier being connected to the other side 302 of the power supply line by conductors 324 and 326. Thus, with the switch arms 304 and 306 in the position illustrated in Fig. 9, the circuit through the motor 30 and the amplifier 336 is closed. The amplifier 336 is in the circuit connected to the head units 44 and 46 for reproducing the sound record on the tape 42.

The solenoid 236 is in a circuit which includes the secondary of a transformer 340. One side of the secondary of the transformer 340 is grounded and the other side is connected by conductor 342 to one side of the coil of the solenoid 236. The other side of the coil of the solenoid 236 is connected by conductor 344 and conductor 184 to the contacts marked 152 in Fig. 9. These contacts are the blocks 152 of the guides 112 and 114. The contacts marked 160 in Fig. 9 are the blocks 160 of the guides 112 and 114. As shown in Fig. 9, the solenoid circuit is open, but will be closed as soon as the portion 186 of the tape 42 bridges the contacts 152 and 160, since the contact 160 is grounded.

While the solenoid circuit just described is open, the transformer 340 is in an energized circuit, as shown in Fig. 9, which may be traced as follows: One side of the primary of transformer 340 is connected by conductor 346 to switch contact 348 through switch arm 350, conductor 352 and resistance 354 to one side 302 of the power supply line. The other side of the primary of the transformer 340 is connected by conductor 360 to conductor 362, switch contact 364, through switch arm 366, conductor 368, conductor 370, to conductor 322, switch arm 304, to the other side 300 of the power supply line. At the same time the circuit is closed through the record and play back head 132 of the right-hand head unit 46 by means of conductor 380, pivoted switch arm 382, stationary switch contact 384, conductor 386 and conductor 390, the conductors 380 and 390 being connected to the amplifier 336 as is conventional.

The circuit through the erase head 130 of the right-hand head unit 46 is in a circuit which includes conductor 390, conductor 392, stationary switch contact 394, movable switch arm 396, and conductor 398, but since the unit is not at this time connected into a recording circuit, the erase head 130 is not energized.

Figure 8:
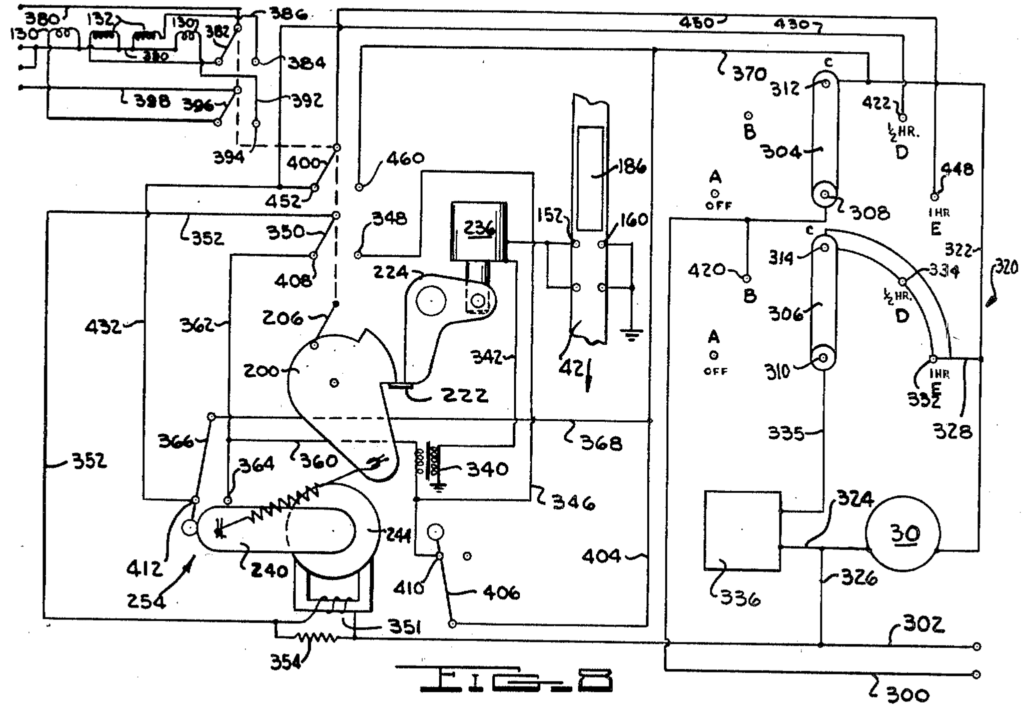
Fig. 8 is a diagrammatic illustration of the circuits and of certain of the mechanical parts of the system which control and effect the opening and closing of the various switches in the several circuits which form the control for the unit. The illustration shows the arrangement of the parts with the unit operating and the record medium running from left to right.

When the portion 186 of the tape 42 bridges the contacts 152 and 160, the circuit of the solenoid 236 will be energized, thereby causing the trip lever 224 to turn in a counterclockwise direction about its pivot and tripping the rocker 200. As soon as the end 222 of the trip lever 224 is disengaged from the part 220 of the rocker, the spring 238 will cause the rocker to shift to its other position, that is, to the position as shown in Fig. 8. The actuating lever 206 of the 4-pole, two-position switch 54 will then be moved by the rocker 200 to the position shown in Fig. 8.

The movable switch arms 350, 400, 396 and 382 are all connected so as to be moved by the lever 206, and when such lever 206 is moved by movement of the rocker arm, as just described, the switch arms 350, 400, 396 and 382 will all simultaneously shift to the position as illustrated in Fig. 8. Generally speaking, this will switch the circuits so as to de-energize the head unit 46 and to energize the head unit 44. It should also be remembered in this connection that when the rocker arm 200 shifts from the position shown in Fig. 9 to that shown in Fig. 8, the direction of the drive of the tape will be reversed as previously described.

The movement of switch arm 350 out of engagement with contact 348 will open the circuit through the primary of the transformer, thereby de-energizing the same. While the windings 351 of the motor for the motor unit 244 are in series with the primary of the transformer 340, when the circuit is arranged as shown in Fig. 9 the motor 244 will not draw sufficient current to operate at such time. However, when the switch arm 350 moves out of engagement with the contact 348, the primary of the transformer 340 is cut out of the circuit and the motor windings 351 may then draw sufficient current to initiate the operation of the motor 244. The circuit through the motor then will be as follows: From line 300 through switch arm 304, contact 312, conductor 370, conductor 368, switch arm 366, contact 364, conductor 362, contact 408, switch arm 350, conductor 352, the motor windings 351, and line 302.

The movable switch arm 366 is the movable switch arm of microswitch 254, and the microswitch is arranged so that the arm 366 normally is in engagement with the contact 364.

When the motor 244 is driven, it will move the cam 240 from the position shown in Fig. 9 to that shown in Fig. 8, thereby tensioning the spring 238 and cocking the rocker arm 200. The cam 240 upon operation of the motor 244 will release the switch arm 406 which is the movable switch arm of the microswitch 252, and permit this switch arm to engage contact 410. The switch arm 406 normally is in engagement with the contact 410 and is held in its open position by the cam 240 when the circuit is arranged as shown in Fig. 9. However, as previously mentioned, operation of the motor 244 will drive the cam 240 to its other position as shown in Fig. 8, which will permit microswitch 252 to close and which will open microswitch 254 when the cam 240 engages the switch arm 366, the cam 240 thereby disengaging switch arm 366 from contact 364 and moving switch arm 366 into engagement with contact 412, as shown in Fig. 8.

When the cam 240 releases the switch arm 406 of the microswitch 252, the switch arm 406 will engage the contact 410. When the cam 240 causes switch arm 366 of the microswitch 254 to separate from contact 364 and to engage contact 412, the circuit which was energizing the motor 244 will be opened, thereby de-energizing the motor 244, and a new circuit will be established to energize the primary of the transformer. This circuit will then include conductor 370, conductor 404, switch arm 406, switch contact 410, conductor 360, conductor 362, switch contact 408, movable switch arm 350, conductor 352, the resistance 354, and the motor windings 351, but since the primary of the transformer 340 is in series with the motor windings, the motor will not draw sufficient current to operate. The circuit and the parts which control the switches thereof will then be arranged as shown in Fig. 8 and the unit will continue to play with the tape being driven from left to right until the portion 186 of the other end of the tape 42 bridges the contacts 152 and 160 which closes the circuit through the solenoid and initiates a reversing operation which will again restore the circuits and the mechanical elements which control the same to the position as illustrated in Fig. 9.

When the switch arms 304 and 306 are in the position marked B, the switch arm 306 will be in engagement with the contact 420 which will close the circuit through the amplifier. The unit will otherwise be deenergized. When the switch arms 304 and 306 are in the position marked A, all of the circuits will be de-energized. When the switch arms 304 and 306 are moved to the position marked D, the switch arm 304 will be in engagement with the contact 422 and the switch arm 306 will be in engagement with the contact 334. In this position of the switch 320 the amplifier and the motor 30 will be energized and the unit will run continuously in one direction until the contact 186 on the tape 42 closes the solenoid circuit. In other words, in the D position of the switch 320, the mechanism will not reverse itself.

With the unit running from left to right, as shown in Fig. 8, the line 300 will be connected through switch arm 304 to contact 422 and to conductor 430 which is connected to conductor 432. Conductor 432 is connected to switch contact 412. The circuit at such time further includes switch arm 366, conductor 368, conductor 370, conductor 322 which is connected to the line 302 with the motor and the amplifier arranged in parallel. The circuit through the primary of the transformer 340 is also closed through conductor 404, switch arm 406, contact 410, conductor 360, conductor 362, switch contact 408, switch arm 350, conductor 352, and through the resistance 354 to the line 302. However, as the primary of the transformer 340 is in series with the windings 351 of the motor, the motor will not operate. When the contact 186 on the tape 42 closes the circuit through the solenoid, the solenoid will be energized and effect the tripping of the rocker 200 which will effect the disengagement of switch arm 350 from the contact 408, thereby deenergizing the primary of the transformer 340 and closing the circuit for the motor 244 from switch contact 410 through conductor 346, switch contact 348, switch arm 350 and conductor 352, whereupon the motor 244 will begin operating. However, as soon as the cam 240 moves away from the switch arm 366, the circuit for the motor 244 as well as for the motor 30 and the amplifier will be opened and the unit will stop.

Movement of the switch arms 304 and 306 to switch position E will set the machine to play both of the sound tracks on the tape 42, that is, to go through one complete cycle of operation, at the end of which the unit will stop. When the switch 320 is so set, the motor and the amplifier will be energized by the following circuit arrangement: switch arm 304, contact 448, conductor 450, switch arm 400, switch contact 452, conductor 432, contact 412, switch arm 366, conductor 368, conductor 370, conductor 322, switch arm 306, conductor 335, and conductors 324 and 326. The primary of the transformer will also be energized through conductors 404, switch arm 406, contact 410, conductors 360 and 362, switch contact 408, switch arm 350, conductor 352, and the resistance 354. The motor 244, however, will not operate since the primary of the transformer is energized. However, when the solenoid circuit is energized by the contact 186 in the manner previously described, the rocker 200 will be tripped, thereby throwing switch arms 400 and 350 out of engagement with the contacts 452 and 408 respectively, and into engagement with the contacts 460 and 348 respectively.

The circuit for the motor 30 and the amplifier 336 will then be energized from contact 460 through conductors 370 and 322, and the motor 30 will drive the tape 42 in the reverse direction. However, the movement of switch arm 350 out of engagement with contact 408 will open the circuit through the transformer primary, thereby de-energizing the solenoid circuit. However, the motor circuit for the motor 244 will be closed through conductor 404 from conductor 370 through switch arm 406, contact 410, conductor 346, contact 348, switch arm 350 and conductor 352. The motor 244 will continue to operate until switch arm 406 is moved out of engagement with switch contact 410, whereupon the motor 244 will stop, and the movement of the cam 240 will of course permit the switch arm 366 to disengage from contact 412 and to engage contact 364 which will energize the primary of the transformer 340 as soon as the switch arm 406 separates from the contact 410. When the contact 186 on the tape 42 again closes the solenoid circuit, the rocker arm 200 will reverse and disengage the switch arm 400 from the contact 460, thereby opening the circuit through the motor 30 and the amplifier 336. Since the switch 254 is open at this time, the unit will cease operating.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In a magnetic recording and reproducing device adapted to employ a pair of reels with a magnetic elongated record medium wound on one of said reels and connected to the other of said reels so that such medium may be wound on said other reel as it is unwound from said one reel, said device comprising a pair of rotary reel holding and driving members, each adapted to have a medium reel thereon, a rotary driving means for each of said members, both of said rotary driving means rotating in the same direction, each of said reel driving members having a slipping driving arrangement relative to said driving means therefor which tend to rotate said reels in a direction to wind said medium on both of said reels at the same time, a rotary engaging and driving member for said medium driven with said means, a pair of magnetic heads between which said driving member for said medium is arranged, each of said heads being selectively operable for recording and/or reproducing a magnetic sound track on said medium, said heads being arranged for said medium to pass thereover as it is wound on one reel and unwound from the other, a pair of idlers between said heads and arranged in driving relation with each other and between which said medium passes on its travel from one of said reels to the other, means for selectively positioning a selected one of said idlers in driven relation with said driving member for said medium thereby to drive said idlers and said medium in a selected direction, shifting means operable to shift the other of said idlers into driven relation with said medium driving member thereby to reverse the drive of said idlers and said medium, and means operated during said medium drive reversing operation to activate one of said heads and de-energize the other of said heads.

2. In a magnetic recording and reproducing device adapted to employ a pair of reels with a magnetic elongated record medium wound on one of said reels and connected to the other of said reels so that such medium may be wound on said other reel as it is unwound from said one reel, said device comprising a pair of rotary reel holding and driving members, each adapted to have a medium reel thereon, a rotary driving member for said medium, a pair of magnetic heads between which said driving member for said medium is arranged, each of said heads being selectively operable for recording and/or reproducing a magnetic sound track on said medium, said heads being arranged for said medium to pass thereover as it is wound on one reel and unwound from the other, a pair of idlers between said heads and arranged in driving relation with each other and between which said medium passes on its travel from one of said reels to the other, means for selectively positioning a selected one of said idlers in driven relation with said driving member for said medium thereby to drive said idlers and said medium in a selected direction, and shifting means operable for shifting the other of said idlers into driven relation with said medium driving member thereby to reverse the drive of said idlers and said medium.

3. A magnetic recording and reproducing device comprising a pair of rotary reel holding and driving members, each having a reel thereon, an elongated record medium medium wound on one of said reels and connected to the other of said reels so that it may be wound on the other reel as it is unwound from said one reel, friction means for each of said members tending to drive said members simultaneously in the same direction and at the same speed in a direction to wind said medium on both of said reels at the same time, a rotary driving member for said medium, a pair of magnetic heads, each of said heads being selectively operable for recording and/or reproducing a magnetic sound track on said medium, said heads being arranged for said medium to pass thereover as it is wound on one reel and unwound from the other, a pair of idlers arranged in driving relation with each other and between which said medium passes, means for selectively positioning a selected one of said idlers in driven relation with said driving member for said medium thereby to drive said idlers and said medium in a selected direction, and means operable in response to the approach of the end of said medium to said heads to shift the other of said idlers into driven relation with said medium driving member thereby to reverse the drive of said idlers and said medium, and means operated during said medium drive reversing operation to activate one of said heads and de-energize the other of said heads.

4. A magnetic recording and reproducing device comprising a pair of rotary reel holding members each having a reel thereon, an elongated record medium wound on one of said reels and connected to the other of said reels so that it may be wound on the other reel as it is unwound from said one reel, a driving member for said medium, a pair of magnetic heads, each operable for recording and/or reproducing a magnetic sound track on said medium, said heads being arranged for said medium to pass thereover as it is wound on one reel and unwound from the other, a pair of idlers arranged in driving relation with each other and between which said medium passes on its travel between said reels, means for selectively positioning a selected one of said idlers in driven relation with said driving member for said medium thereby to drive said idlers and said medium in a selected direction, and means operable in response to the approach of the end of said medium to said heads to automatically shift the other of said idlers into driven relation with said medium driving member thereby to drive said idlers and said medium in the opposite direction.

5. A device according to claim 4, including means operated during said medium drive reversing operation to activate one of said heads and de-energize the other of said heads.

6. In a magnetic recording and reproducing device comprising a pair of rotary reel holding and driving members each having a reel thereon, an elongated record medium wound on one of said reels and connected to the other of said reels so that it may be wound on the other reel as it is unwound from said one reel, driving means tending to drive said members simultaneously in the same direction and at the same speed in a direction tending to wind said medium on both of said reels at the same time, said reel driving members having a slipping driving arrangement relative to said driving means therefor which permits said reels to rotate relatively freely with respect to said driving means, a rotary driving member for said medium driven with said means, a pair of magnetic heads, each operable for recording and/or reproducing a magnetic sound track on said medium, said heads being arranged for said medium to pass thereover as it is wound on one reel and unwound from the other, a pair of idlers biased in to driving relation with each other and between which said medium passes between said heads, means for selectively positioning a selected one of said idlers in driven relation with said driving member for said medium thereby to drive said medium in a selected direction, and means operable in response to the approach of a portion of said medium to said heads to automatically shift the other of said idlers into driven relation with said medium driving member thereby to drive said medium in the opposite direction, and means operated during said medium drive reversing operation to activate one of said heads and de-energize the other of said heads.

7. In a magnetic recording and reproducing device employing a pair of reels with an elongated record medium wound on one of said reels and connected to the other of said reels so that such medium may be wound on the other reel as it is unwound from said one reel, a rotary driving member, a pair of idlers between which said medium passes on its travel from one of said reels to the other, means biasing said idlers into driving relation with each other, means for selectively positioning a selected one of said idlers in driven relation with said driving member thereby to cause said idlers to drive said medium in a selected direction, and means responsive to the travel of a predetermined portion of said medium between said reels for automatically shifting the other of said idlers into driven relation with said driving member thereby to reverse the direction of travel of said medium.

8. In a magnetic recording and reproducing device employing a pair of reels with an elongated record medium wound on one of said reels and connected to the other of said reels so that such medium may be wound on the other reel as it is unwound from said one reel, a rotary driving member for said medium, a pair of idlers between which said medium passes on its travel from one of said reels to the other, a pair of pivoted arms, each carrying one of said idlers, spring means reacting on said arms for biasing said idlers into driving relation with each other, means for positioning one of said idlers in driven relation with said driving member thereby to drive said medium in a selected direction, a guide over which said medium passes between each of said idlers and each of said reels, a magnetic recording and/or reproducing head between each of said idlers and each of said guides, and reversing mechanism automatically operable in response to the passage of a predetermined portion of said medium over one of said guides and cooperable with said arms for shifting the same so as to position the other of said idlers in driven relation with said driving member thereby to reverse the direction of travel of said medium.

9. A device according to claim 8, including means associated with said reversing mechanism for de-energizing one of said heads and energizing the other of said heads.

10. In a magnetic recording and reproducing device adapted to employ a pair of reels with an elongated magnetic record medium wound on one of said reels and connected to the other of said reels so that such medium may be wound on said other reel as it is unwound from said one reel, a pair of magnetic heads, each of said heads being operative for recording and/or reproducing a magnetic sound track on said medium, said heads being arranged for said medium to pass in operative relation therewith as it is wound on one reel and unwound from the other, means including a pair of rotary idlers in driven relation with each other and operative for driving said medium therebetween so as to wind the same on one reel and unwind it from the other, a rotary driving member, means for positioning one of said idlers in driven relation with said rotary driving member for driving said idlers and said medium in one direction, means to energize one of said heads during the movement in one direction of said medium thereover, means automatically operable in response to the approach of one end of said medium to one of said heads for positioning the other of said idlers in driven relation with said rotary member, thereby reversing the direction of rotation of said idlers and the direction of travel of said medium, and means operable in connection with said reversing operation for de-energizing said one head and energizing the other of said heads.

11. In a magnetic recording and reproducing device employing a pair of reels with an elongated record medium wound on one of said reels and connected to the other of said reels so that such medium may be wound on the other reel as it is unwound from said one reel, said device comprising a pair of rotary reel holders, each adapted to have one of said reels thereon, a rotary driving member for said medium, a pair of idlers in driving relation with each other and between which said medium passes on its travel from one of said reels to the other, means for selectively arranging one of said idlers in driven relation with said driving member thereby to drive said medium in a selected direction, and means tending to drive both said holders simultaneously at the same speed and in a direction tending to wind said medium on both of said reels at the same time, said holders having a slipping driving arrangement relative to said driving means therefor which permits one of said reels to rotate relatively freely in a direction opposite that of its driving means but with sufficient drag so as to maintain the proper tension on said medium as it is being wound and unwound from said reels.

12. A device according to claim 11 wherein said means for driving said reel holders comprise angularly inclined driven shafts whereby the tendency of each shaft to drive its reel is proportional to the mass of said reel and the medium wound thereon.

13. In a magnetic recording and reproducing device employing a pair of reels with an elongated record medium wound on one of said reels and connected to the other of said reels so that such medium may be wound on the other reel as it is unwound from said one reel, said device comprising a pair of inclined driving shafts, a pair of rotary reel holding and driving members, each adapted to have one of said reels thereon and each being mounted on one of said shafts, a slipping drive between each of said shafts and the member mounted thereon, means operable for driving said shafts simultaneously in the same direction thereby tending to wind said medium on both of said reels at the same time so that one or the other of said reels rotates in a direction opposite that of its driving shaft regardless of the direction of travel of said medium, a rotary driving member for said medium, a pair of idlers in driving relation with each other and between which said medium passes on its travel from one of said reels to the other, means for positioning a selected one of said idlers in driven relation with said driving member thereby to drive said idlers and said medium in a selected direction, a guide for said medium between said idlers and each of said reels, means for shifting the other of said idlers into driven relation with said driving member thereby to reverse the direction of drive of said idlers and the direction of travel of said medium, and means associated with said guides responsive to the passage thereover of a particular portion of said medium for actuating said shifting means.

14. In a magnetic recording and reproducing device employing a pair of reels with an elongated record medium wound on one of said reels and connected to the other of said reels so that such medium may be wound on the other reel as it is unwound from said one reel, a rotary driving member for said medium, a pair of idlers in driving relation with each other and between which said medium passes on its travel from one of said reels to the other, means for positioning a selected one of said idlers in driven relation with said driving member thereby to drive said idlers and said medium in a selected direction, a guide for said medium between said idlers and each of said reels, means for shifting the other of said idlers into driven relation with said driving member thereby to reverse the direction of drive of said idlers and the direction of travel of said medium, and means associated with said guides responsive to the passage thereover of a particular portion of said medium for actuating said shifting means.

15. In a magnetic recording and reproducing device employing a pair of reels with an elongated record medium connected thereto so that said medium may be wound on one reel as it is unwound from the other, a rotary driving member, a pair of idlers between which said medium passes on its travel from one of said reels to the other, means for biasing said idlers into driving relation with each other, means for positioning one of said idlers in driving relation with said driving member to cause said idlers to drive said medium in one direction, reversing mechanism for shifting the other of said idlers into driven relation with said driving member to thereby reverse the direction of rotation of said idlers and therefor the direction of travel of said medium, a pair of magnetic heads each operable for recording and/or reproducing a sound track on different parts of said medium, switch means for energizing one of the said heads and deenergizing the other of said heads, said switch means being connected to said reversing mechanism so as to be automatically operable whenever said mechanism reverses the direction of travel of said medium, said reversing mechanism including means responsive to the approach of an end of said medium to said heads for automatically actuating said reversing mechanism whenever an end of said medium approaches said heads.

References Cited in the file of this patent

UNITED STATES PATENTS

| | | |
|---|---|---|
| 947,148 | Browne | Jan. 18, 1910 |
| 2,080,812 | Fairbanks | May 18, 1937 |
| 2,304,913 | Herzig | Dec. 15, 1942 |
| 2,328,539 | Greenleaf et al. | Sept. 7, 1943 |
| 2,335,277 | Heller | Nov. 30, 1943 |
| 2,351,005 | Camras | June 13, 1944 |
| 2,430,538 | Somers | Nov. 11, 1947 |
| 2,481,904 | Camras | Sept. 13, 1949 |
| 2,603,006 | MacChesney | July 15, 1952 |
| 2,637,561 | Connell | May 5, 1953 |